United States Patent
Reuter

(12) 
(10) Patent No.: US 6,622,071 B2
(45) Date of Patent: Sep. 16, 2003

(54) ACCELERATION MONITORING METHOD FOR A LONGITUDINAL DYNAMICS OPEN-LOOP OR CLOSED-LOOP CONTROLLER IN MOTOR VEHICLES

(75) Inventor: Hagen Reuter, Frankfurt (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/735,703

(22) Filed: Dec. 12, 2000

(65) Prior Publication Data

US 2002/0000122 A1 Jan. 3, 2002

(30) Foreign Application Priority Data

Dec. 16, 1999 (DE) .......................................... 199 60 782

(51) Int. Cl.$^7$ .............................................. G01M 17/02
(52) U.S. Cl. ......................................... 701/29; 180/170
(58) Field of Search ............................. 701/29, 96, 93, 701/301, 95; 180/170, 179

(56) References Cited

U.S. PATENT DOCUMENTS

| | | | | |
|---|---|---|---|---|
| 5,128,869 A | * | 7/1992 | Akishino et al. | ............ 123/352 |
| 5,233,530 A | * | 8/1993 | Shimada et al. | ............ 123/350 |
| 5,265,472 A | * | 11/1993 | Pfeifle et al. | .................. 701/70 |
| 5,396,426 A | * | 3/1995 | Hibino et al. | ................ 123/352 |
| 5,510,990 A | * | 4/1996 | Hibino et al. | ................ 180/169 |
| 5,631,639 A | * | 5/1997 | Hibino et al. | ................ 180/167 |
| 5,638,790 A | * | 6/1997 | Minowa et al. | ............. 123/399 |
| 5,765,117 A | * | 6/1998 | Horiguchi | .................... 477/120 |
| 5,948,026 A | * | 9/1999 | Beemer et al. | ............. 701/115 |
| 6,044,321 A | * | 3/2000 | Nakamura et al. | .......... 180/179 |
| 6,070,682 A | * | 6/2000 | Isogai et al. | ................. 180/167 |
| 6,134,497 A | * | 10/2000 | Hayashi et al. | ............. 340/435 |
| 6,175,799 B1 | * | 1/2001 | Tsutsumi et al. | ............ 340/903 |
| 6,236,915 B1 | * | 5/2001 | Furukawa et al. | ............. 701/23 |
| 6,339,740 B1 | * | 1/2002 | Seto et al. | ................... 340/904 |
| 6,345,227 B1 | * | 2/2002 | Egawa et al. | ................ 180/170 |
| 6,363,306 B1 | * | 3/2002 | Palmertz et al. | ......... 280/728.1 |

* cited by examiner

*Primary Examiner*—Yonel Beaulieu
*Assistant Examiner*—Olga Hernandez
(74) *Attorney, Agent, or Firm*—Martin A. Farber

(57) ABSTRACT

An acceleration monitoring method for a longitudinal dynamics open-loop or closed-loop controller in motor vehicles, in which an actual acceleration value is compared with a desired acceleration value, a defective operating condition of the motor vehicle being detected when the actual acceleration value is situated outside an error corridor including the desired acceleration value. In a method in which Critical driving situations can be detected as quickly as possible, wherein the error corridor is set in a variable fashion as a function of the current handling performance of the motor vehicle.

12 Claims, 2 Drawing Sheets

ACCELERATION MONITORING METHOD FOR A LONGITUDINAL DYNAMICS OPEN-LOOP OR CLOSED-LOOP CONTROLLER IN MOTOR VEHICLES

FIELD AND BACKGROUND OF THE INVENTION

The invention relates to an acceleration monitoring method for a longitudinal dynamics open-loop or closed-loop controller in motor vehicles, in which an actual acceleration value is compared with a desired acceleration value, a defective operating condition of the motor vehicle being detected when the actual acceleration value is situated outside an error corridor including the desired acceleration value.

In conventional speed control systems, speed thresholds and/or acceleration thresholds are used to detect defective operating conditions. These threshold values are fixed in this case and set in an unchangeable fashion. A defective or impermissible response of the vehicle is detected and the active control operation is terminated when, without intervention by the driver, the vehicle speed departs by a specific measure from the desired speed or, in the case of acceleration, when an impermissible acceleration or retardation is reached.

In the case of control devices which set both the distance and the speed of a vehicle, the speed thresholds cannot be used in the situations in which the distance controller is active. Use is made for such devices of fixed acceleration thresholds, but these must be set such that they are already situated in the safety-critical retardation range. However, this means for the safety concept of the vehicle that some defects cannot be detected until there is a very strong effect on the handling performance of the vehicle, and this leads to impermissible critical driving situations.

SUMMARY OF THE INVENTION

It is the object of the invention to specify an acceleration monitoring method in the case of longitudinal dynamics closed-loop control in motor vehicles in the case of which critical driving situations are detected as quickly as possible.

This object is achieved according to the invention wherein error corridor is set in a variable fashion as a function of the current handling performance of the motor vehicle.

The advantage of the invention consists in the fact that errors or impermissible deviations are already detected when the effects on the handling performance are still slight. This is possible in a simple way by virtue of the fact that relative or dynamic acceleration thresholds are used for the monitoring instead of absolute and fixed ones, as previously.

In a development, the error corridor of the acceleration is adapted dynamically to the handling performance of the motor vehicle. Owing to the use of an error corridor, slight deviations in the acceleration value do not lead to intervention in the control.

In a simple design, the error corridor is set as a function of the speed of the vehicle to be controlled.

Alternatively, the error corridor can be varied as a function of the actual acceleration value and/or the desired acceleration value. In both cases, it is possible to react quickly to changes in the driving dynamics of the motor vehicle. Moreover, safety-critical situations can be taken into account more individually. Thus, in the case of high vehicle speeds the range of the desired acceleration value can be selected to be narrower than in the case of lower speeds.

The active control operation of the longitudinal dynamics closed-loop controller of the motor vehicle advantageously goes into an error mode when the actual acceleration value is situated outside the error corridor typifying the desired acceleration value. For reasons of safety, the brakes, engine and drive train go into an emergency operating mode, whereas the control of speed and/or distance are terminated.

In a development of the invention, the desired acceleration value is determined in a first vehicle dynamics system of the vehicle, and the determined desired acceleration value is output to the vehicle for the purpose of driving a second vehicle dynamics system thereof, which compares the determined desired acceleration value with the actual acceleration value and drives a speed-regulating control element of the motor vehicle as a result of the comparison.

The first vehicle dynamics system advantageously includes a distance controller for setting the distance of the vehicle to be controlled relative to a vehicle travelling in front, which controller determines the desired acceleration value from a distance to be set.

Thus, the desired acceleration value determined by the distance controller is used to drive a braking device of the motor vehicle, an electronic engine control or a drive train control or a gear control, thus releasing computing capacity in the said vehicle dynamics system.

In the case of the general use of a braking device of the motor vehicle, an electronic engine control or a drive train control or a gear control, it is possible for the driver to prescribe the desired acceleration value via an appropriate interface of these systems.

BRIEF DESCRIPTION OF THE DRAWINGS

The invention permits numerous embodiments. One of them is to be explained in more detail with the aid of the figures illustrated in the drawings, in which.

DETAILED DESCRIPTION OF THE PREFERRED EMBODIMENT

Identical features are marked with identical reference symbols.

Figure 1:
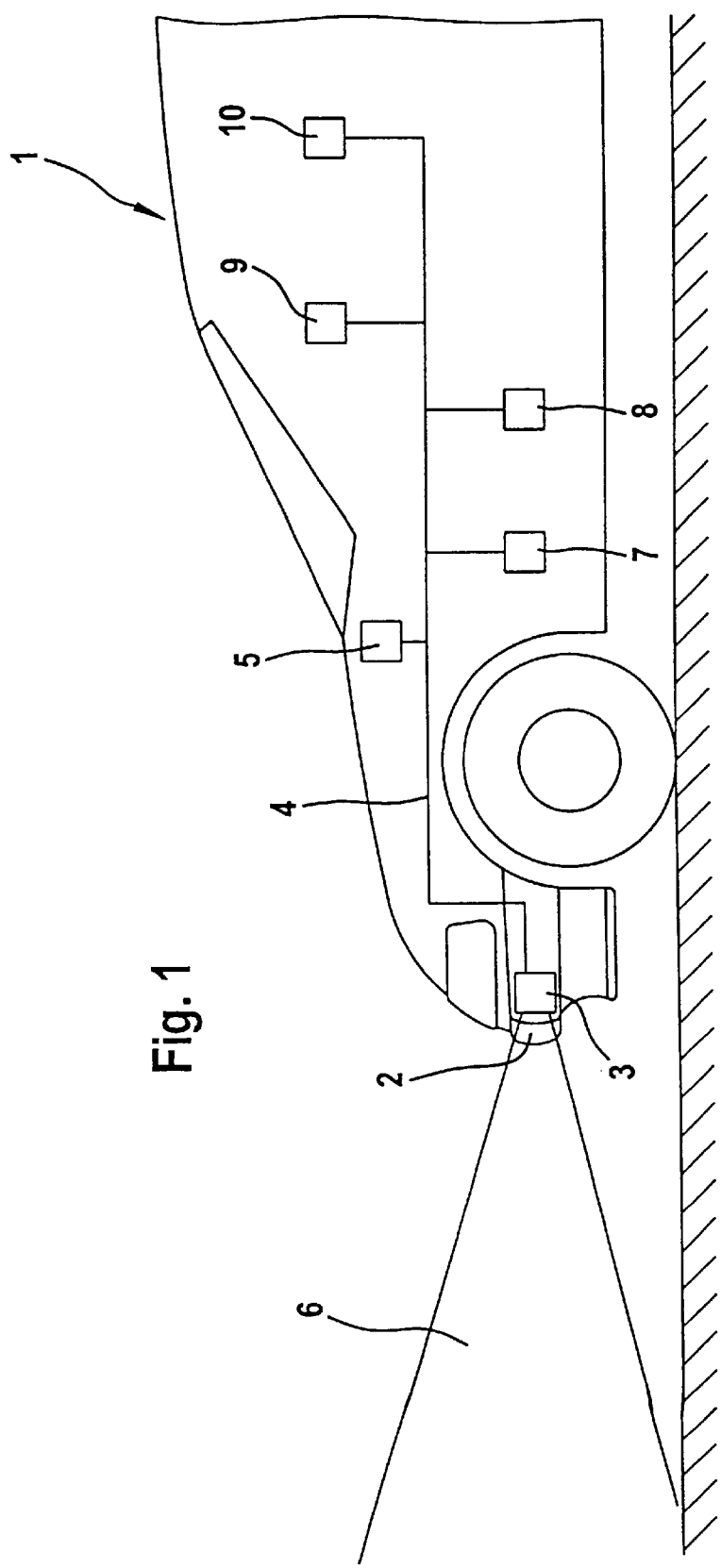
FIG. 1 shows a speed and distance controller.

Arranged in FIG. 1 on the bumper 2 of a motor vehicle 1 is an automatic speed and distance control system 3 for observing the safety distance between vehicles, which contains in the housing a radar sensor, a signal evaluation circuit and the distance and speed control system, which are not further illustrated. Upon activation of the distance controller by the driver of the motor vehicle, vehicles driving in front, or other obstacles, are detected by the sensor beam 6 of the radar sensor. The automatic speed and distance control system 3 is connected, for example, to the engine control 5, a gearbox 7 and a brake 8 via a bus system 4 present in the vehicle 1. Electronic commands, which are generated by the automatic speed and distance controller 3, automatically control the speed, and thus the distance of the controlled vehicle 1 from a slower vehicle driving in front.

If the speed controller is activated, the speed and distance control system 3 compares the current vehicle speed with the desired speed set by the driver and controls it thereto.

In the case of a distance controller, signals supplied by the radar sensor (sensor beam 6) are used to determine the distance and the relative speed of the vehicles driving in front and/or the obstacles, and the safe minimum distance is determined therefrom. If the distance mode has been set by the driver with the aid of the operating switch 10, the distance from the vehicle driving in front is automatically controlled to the selected distance.

In addition to the actual distance from the vehicle driving in front, the speed of the vehicle driving in front and a critical distance are determined from the signal propagation delay and the actual speed of the vehicle to be controlled. The new speed of the vehicle to be controlled is yielded from the acceleration or retardation which is set as a function of the distance determined and of the other variables. The engine electronics 5 and brake 8 are controlled for this purpose.

Figure 2:
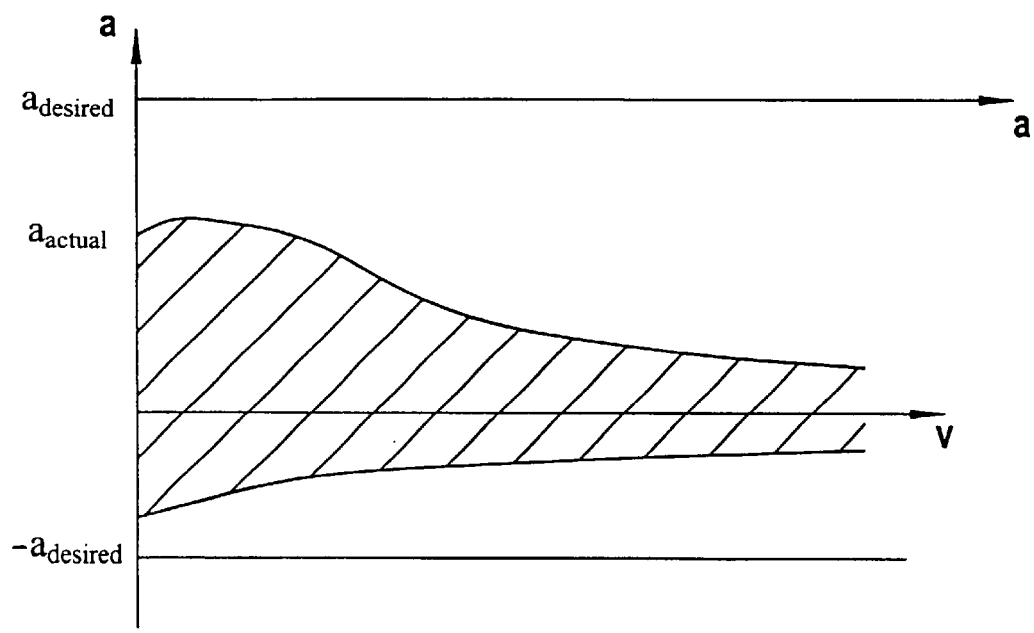
FIG. 2 shows an acceleration monitoring method in accordance with the prior art.

FIG. 2 shows the safety concept, which is used in accordance with the prior art in speed control systems for determining defective operating conditions. In such systems, a desired value $a_{desired}$, prescribed in absolute and fixed terms, is set for the acceleration and serves for monitoring defective conditions. As follows from FIG. 2, however, at high speeds a slight change in the vehicle acceleration is already critical as regards safety. Such an error is, however, indicated only when the acceleration is located outside the range prescribed by $a_{desired}$ and $-a_{desired}$. However, a safe driving condition would be satisfied only when the actual acceleration is within the hatched area.

Figure 3:
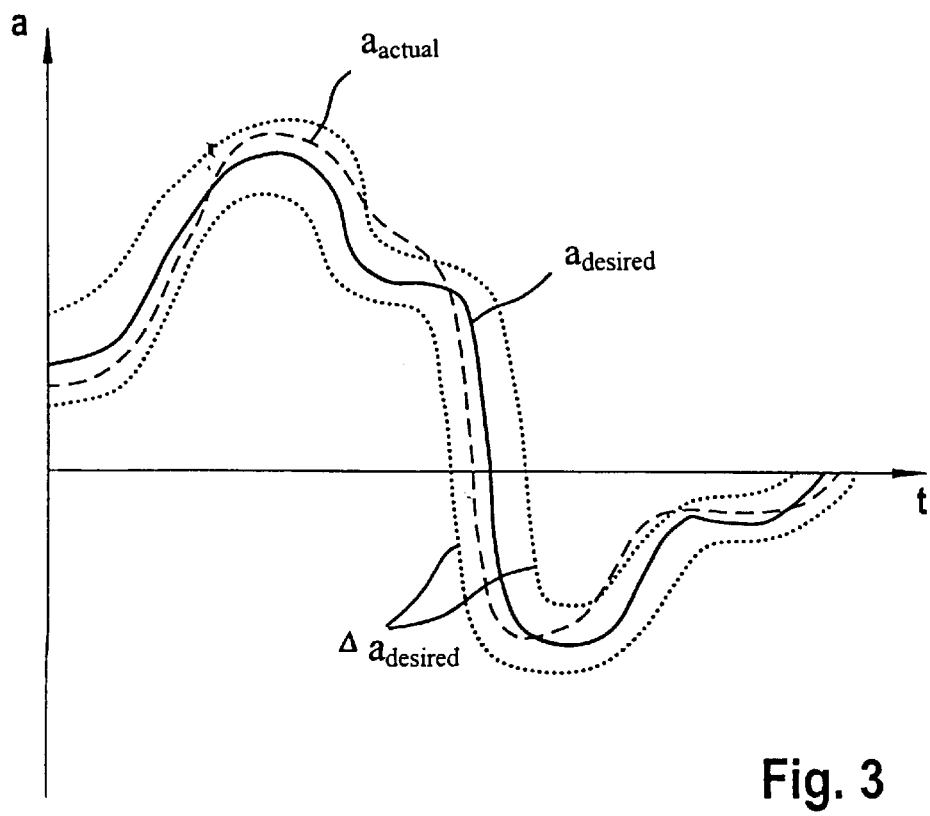
FIG. 3 shows acceleration monitoring according to the invention.

The method according to the invention is now to be explained with the aid of FIG. 3. Here, the dotted area $\Delta a_{desired}$ marks the error corridor in which the actual acceleration $a_{actual}$ may vary without a defective operating condition being detected. The dynamic handling performance is used in determining the area $\Delta a_{desired}$, that is to say the acceleration is regarded over time. Moreover, the error corridor can be determined as a function of the speed of the vehicle to be controlled, but can also be dependent on the absolute value of the current acceleration value (actual and/or desired values). Particularly with regard to the desired acceleration value, the range of the actual acceleration value is of narrower dimension in the case of a slow change in the acceleration of the vehicle than in the case of quick changes in the vehicle acceleration.

It is therefore possible by varying the error limits to set acceleration thresholds of the vehicle which take the instantaneous driving situation of the motor vehicle into consideration. This may be explained with the aid of a simple numerical example.

The permissible desired acceleration of the distance and speed controllers is in the range from +1 to −2 m/s². In the case of the use of permanently prescribed plus/minus acceleration thresholds, these are at +2 m/s² and −3 m/s², respectively.

In the case of a desired acceleration of, for example, 0 m/s², which means that the vehicle to be controlled is following a vehicle driving in front at a constant speed, no error is detected until there is a deviation with an absolute value of 2 m/s or 3 m/s. Defective deviations with an absolute value of 0.5 m/s² can be detected without difficulty with the aid of the method according to the invention.

However, this method for monitoring longitudinal dynamics can be used not only in distance control systems, but in all vehicle systems which intervene in the longitudinal dynamics of the vehicle and/or subject these to open-loop or closed-loop control. Thus, for example, it is possible to use an acceleration or deceleration interface to operate an electric controllable brake (brake by wire), in the case of which the driver prescribes a desired acceleration via an accelerator pedal or a joystick. Such prescriptions of acceleration are also conceivable in drive train controls.

I claim:

1. Acceleration monitoring method for a longitudinal dynamics open-loop or closed-loop controller of a motor vehicle, comprising the steps of comparing an actual acceleration value with a desired acceleration value, detecting a defective operating condition of the motor vehicle when the actual acceleration value is outside an error corridor including the desired acceleration value, wherein a width of the corridor extends over a range of values of acceleration from a first value of acceleration equal to the desired acceleration plus an incremental value of acceleration to a second value of acceleration equal to the desired acceleration minus a further incremental value of acceleration and setting the error corridor in a variable fashion as a function of current handling performance of the motor vehicle.

2. The method as claimed in claim 1, wherein said error corridor of the acceleration varies dynamically with respect to the handling performance of the motor vehicle.

3. The method as claimed in claim 1, wherein the error corridor is set as a function of vehicle speed.

4. The method as claimed in claim 2, wherein the error corridor is varied as a function of the actual acceleration value and/or the desired acceleration value.

5. The method as claimed in claim 2, wherein active control operation of the longitudinal dynamics closed-loop controller of the motor vehicle goes into an error mode when the actual acceleration value is outside the error corridor typifying the desired acceleration value.

6. The method as claimed in claim 1, wherein the desired acceleration value is determined in a first vehicle dynamics system of the vehicle, and the determined desired acceleration value is output to the vehicle for driving a second vehicle dynamics system thereof, which compares the determined desired acceleration value with the actual acceleration value and drives a speed-regulating control element of the motor vehicle as a result of the comparison.

7. The method as claimed in claim 6, wherein the first vehicle dynamics system includes a distance controller for setting distance of the vehicle to be controlled relative to a vehicle traveling in front, which controller determines the desired acceleration value from a distance to be set.

8. The method as claimed in claim 6, wherein said desired acceleration value serves for driving a braking device of the motor vehicle.

9. The method as claimed in claim 6, wherein said desired acceleration value serves for driving an electronic engine control of the motor vehicle.

10. The method as claimed in claim 6, wherein said desired acceleration value serves for driving a drive train control.

11. The method as claimed in claim 10, wherein said desired acceleration value serves for driving a gear control.

12. The method as claimed in claim 6, wherein said desired acceleration value is prescribed by the driver.

* * * * *